United States Patent [19]

Gerber et al.

[11] 4,185,214

[45] Jan. 22, 1980

[54] MINIATURE SYNCHRONOUS MOTOR WITH VIBRATION DAMPER

[75] Inventors: Hermann Gerber, Münchenwiler; Hans Plötscher, Murten, both of Switzerland

[73] Assignee: Sodeco-Saia AG, Murten, Switzerland

[21] Appl. No.: 934,719

[22] Filed: Aug. 21, 1978

[30] Foreign Application Priority Data

Aug. 31, 1977 [CH] Switzerland .................... 010590/77

[51] Int. Cl.[2] .............................................. H02K 5/24

[52] U.S. Cl. ........................................ 310/51; 310/90; 310/40 MM

[58] Field of Search .......... 310/51, 40 MM, 90, 49 R, 310/162, 164, 156, 261, 264, 265

[56] References Cited

U.S. PATENT DOCUMENTS

| | | | |
|---|---|---|---|
| 2,307,772 | 1/1943 | Duffy | 310/51 X |
| 3,161,794 | 12/1964 | Lindgren | 310/90 X |
| 3,253,170 | 5/1966 | Phillips et al. | 310/51 |
| 3,453,465 | 7/1969 | Boer et al. | 310/51 UX |
| 3,496,393 | 2/1970 | Reifman | 310/49 R |
| 3,666,057 | 5/1972 | Leifer et al. | 310/51 X |
| 3,816,782 | 6/1974 | Dow et al. | 310/90 |
| 3,906,264 | 9/1975 | Kuwako et al. | 310/51 |
| 3,936,680 | 2/1976 | Kuwako et al. | 310/40 MM |

*Primary Examiner*—Mark O. Budd

*Attorney, Agent, or Firm*—Wender, Murase & White

[57] ABSTRACT

A miniature synchronous motor having a bell-shaped rotor and a damping body, freely mounted, but non-rotatable on the rotor shaft. The damping body being urged, at least substantially in a radial direction by a spring, the force of which also acts substantially equally for both bearings of the motor so as to reduce noise during operation.

14 Claims, 5 Drawing Figures

MINIATURE SYNCHRONOUS MOTOR WITH VIBRATION DAMPER

BACKGROUND AND SUMMARY OF THE INVENTION

The present invention relates to a miniature synchronous motor, as used, for example, in synchronous watches or as a stepping motor in step-by-step switches, time switches and program switches. In many applications for example, in the case of synchronous watches a particularly silent operation of the synchronous motors is required. Moreover, a high performance is frequently also required which, for example, in miniature synchronous motors is attained only with a group of main and auxiliary poles on the stator, which groups are substantially oppositely positioned. Of these motors it is also known that radial vibrations may occur which, in rotor bearings with no play, may lead to noises.

It is known to provide a pawl with slight pressure abutment against a disc of the rotor to determine the direction of starting of a synchronous motor and to absorb rotary vibrations of the rotor. See, U.S. Pat. No. 3,496,393. It will thereby act with a minimum of compressive pressure against a disc of large circumference, in which case it is possible to produce a sufficient transverse pressure in the motor bearings to silence noises. However, the slight radial application pressure in known motors affects substantially only one bearing and for this reason it could not substantially contribute towards any silencing.

The object of the present invention is to provide a particularly silent miniature synchronous motor.

According to the present invention there is provided a miniature synchronous motor having a damping body acting on the rotor, comprising a non-rotating damping body mounted freely on the rotor shaft and which is urged in an at least a substantially radial direction against the shaft.

Preferably a damping body made of plastic material may be urged by a wire spring or a spring integrally formed therewith against the rotor shaft. It has been found that this measure permits a substantial silencing or absorption of noise, because by this concept a favorable ratio of friction moment relative to radial force is obtained, i.e. the relatively large radial force for suppressing radial rotor vibrations only has a small friction moment, since the rotor shaft is generally made of ground and polished steel and has a small diameter. This also makes it possible for plastic material bearings to be used which, as such, have greater tolerances and hence more bearing clearance than metal bearings, so that the plastic material bearings compared with metal bearings also contribute to the reduction of noise. Moreover, this device also damps rotary vibrations and the double rotary field caused by unavoidable tolerance deviations of the stator poles, rotor poles and the air gap, and also starting up in the wrong direction is substantially prevented.

To obtain an optimal silencing the application pressure or damping force should be at least equal to the rotor weight, so that, for optional installation positions of the motor, the bearing play is cancelled. This force is preferably at least equal to the vector sum of the rotor weight and the magnetic radial forces acting on the rotor. Moreover, the direction of the application pressure force should be such that it acts substantially to an equal extent on the two motor bearings.

The invention will now be described further, by way of example, with reference to the accompanying drawings.

DESCRIPTION OF THE PREFERRED EMBODIMENTS

Figure 1:
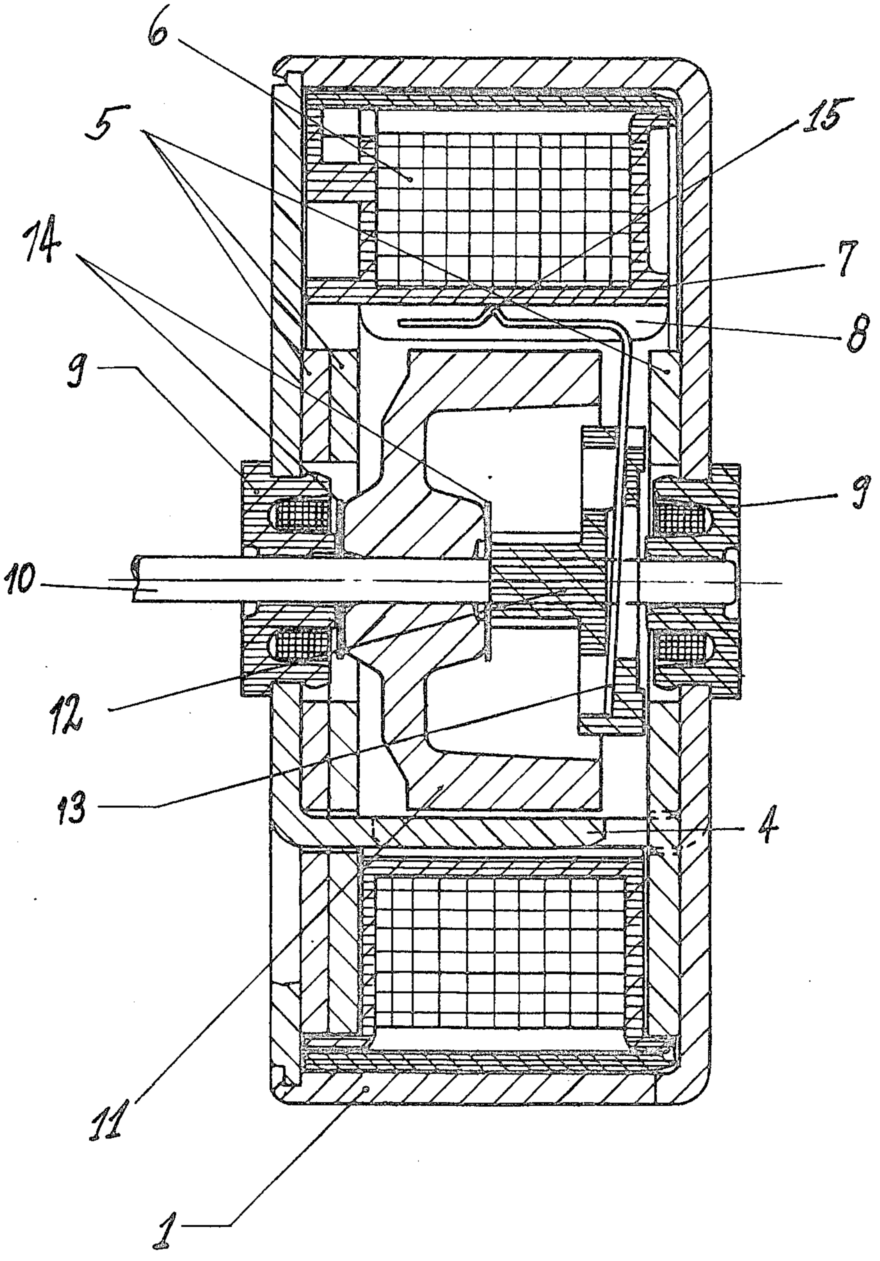
FIG. 1 is an axial sectional view of a preferred embodiment of a motor according to the present invention.
Figure 2:
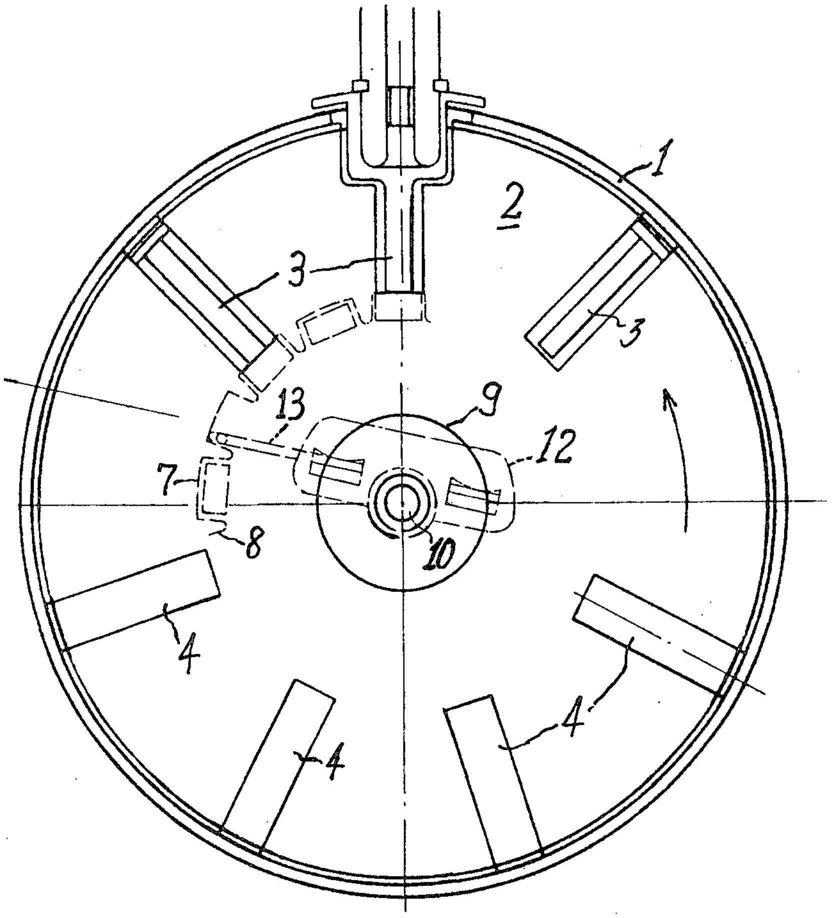
FIG. 2 is an end elevational view of the motor of FIG. 1.

A miniature synchronous motor, according to FIGS. 1 and 2, has stator parts 1 and 2 riveted together and having notched an inwardly-bent main poles 3 and auxiliary poles 4. In a manner known per se, a group each of main poles and auxiliary poles are provided, which groups are opposite each other and wherein more auxiliary poles are provided than main poles. The auxiliary poles 4 project through apertures or slits of short-circuit discs 5, two of which are provided on the left-hand side, with reference to FIG. 1, and one is provided on the right-hand side.

A coil 6 is wound on a coil body 7 made of plastic material, which on the inside surface has ribs 8 between which the stator poles 3 and 4 engage.

The stator parts 1 and 2 are each provided with a plastic material bearing 9, and a bell-shaped rotor 11 having permanent magnet poles is mounted on a shaft 10 supported in bearings 9. A damping body 12, the flange-like part of which is perforated, is loosely mounted on the shaft 10 and forms a holder for a wire spring 13. The damping body 12 engages partially into the bell-shaped rotor 11, so that any additional requirement of space in an axial direction is very slight. A washer 14 is inserted between the boss of the damping body 12 and the boss of the rotor 11, on the one hand, and between the boss of the rotor 11 and one bearing 9, on the other hand.

As shown by FIG. 1, the wire spring 13 is inserted in the damping body 12 slightly inclined relative to a radial plane. The outer axially extending shank of the wire spring 13 is supported with a crank 15 displaceably and at a point, respectively, in an exposed groove between adjacent ribs 8 of the coil body 7. By this means, the wire spring 13 transmits a radial force to the damping body 12, which urges it against the shaft 10. Hence the radial play of the rotor in the bearings 9 is cancelled and the above-described damping attained with all its favorable effects.

If the crank 15 of the wire spring 13 engages behind a stop or the coil body or in a recess so that it is axially secured, it may be pre-tensioned so that it also exerts a force component in an axial direction on the damping body 12, whereby also the axial clearance of the rotor is cancelled.

Figure 3:
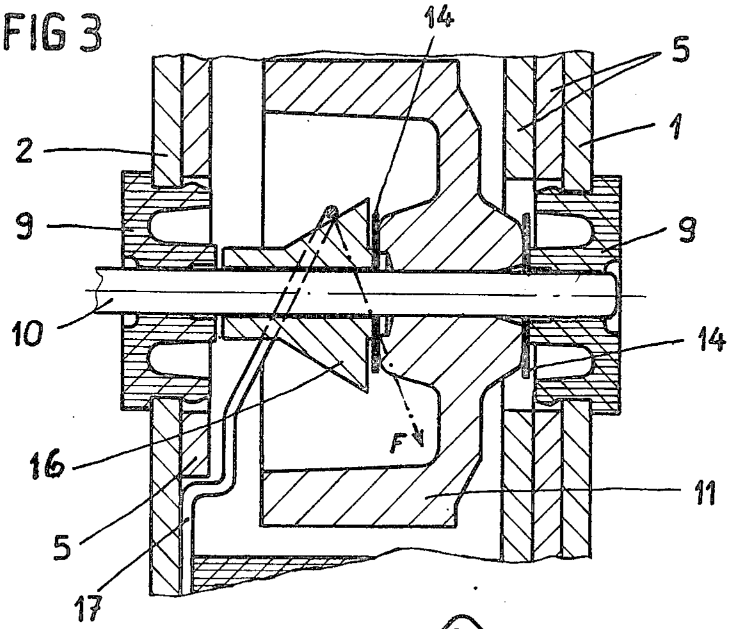
FIG. 3 is a sectional view of a portion of a first alternative embodiment of a damping body of the motor according to the present invention.

In FIG. 3, the corresponding parts are denoted identically as in FIG. 1, but in place of the damping body 12 a substantially simpler damping body 16 having a conical surface is provided. One end of the wire spring 17, which is securely anchored between the stator part 2 and the coil body, acts on this conical surface. The same wire 17 exerts a force F on the damping body 16 which force F is inclined relative to a radial plane and hence urges the damping body 16 radially against the shaft 10 and axially against the boss of the rotor 11, so that the radial and axial clearance of the rotor is removed.

Figure 4:
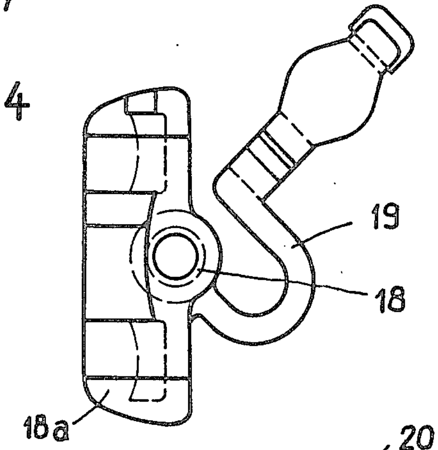
FIG. 4 is an end elevational view of a second alternative embodiment of the damping body of the motor.
Figure 5:
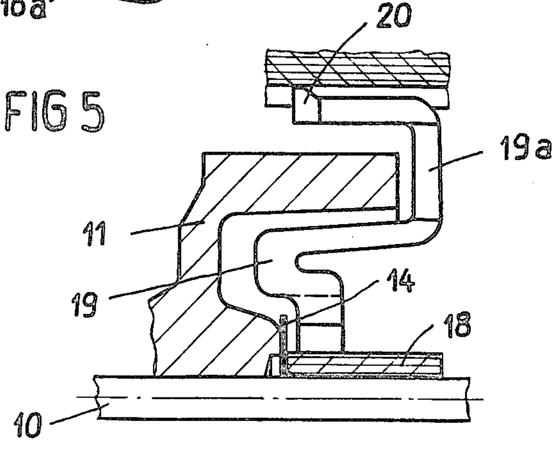
FIG. 5 is a side view, partly in section, of the damping body of FIG. 4.

FIGS. 4 and 5 show a damping body 18 made of plastic material which is integrally formed with a spring 19. The spring 19 has a cranked portion 19*a* which encloses the rotor. The spring 19 with its end 20, similarly to the spring of FIG. 1, is supported against the inside surface of the coil body in such a manner that it exerts a force with radial and axial components on the damping body 18.

A flange-like shoulder 18*a* of the damping body 18 is adapted as a holder for wire spring 13 in accordance with FIG. 1, so that this damping body 18 may be used optionally with the integrally formed spring 19 or with a wire spring in accordance with FIG. 1.

In all embodiments it is of significance that the damping bodies are located at least partially in a recess of a bell-shaped rotor, so that the line of action of the spring intersects the motor axis in the center between the two motor bearings as indicated in FIG. 3. This causes the force of the spring to act substantially evenly in both motor bearings.

We claim:

1. A miniature synchronous motor having a single damping body acting on the rotor, comprising a non-rotating damping body mounted for free rotation on the motor shaft, spring means acting on said body in one direction including a substantial radial component whereby said body is urged in an at least substantially radial direction against the shaft and radial play of the rotor is thereby prevented.

2. A motor according to claim 1, in which the force with which the damping body is urged is so directed that it subjects both motor bearings to a substantially equal load.

3. A motor according to claims 1 or 2, in which the motor bearings are of plastic material.

4. A motor according to claim 1, in which a spring which is supported against a fixed motor part acts on the damping body.

5. A motor according to claim 1 in which the damping body is mainly located in the recess of a bell-shaped rotor.

6. A motor according to claims 4 or 5 in which a wire spring is retained in the damping body and displaceably and punctiformly supported on a fixed part.

7. A motor according to claim 6, in which the wire spring is supported on the inside surface of a coil former of the motor.

8. A motor according to claim 6, in which the punctiform support is located substantially in the center of the motor.

9. A motor according to claim 1 in which the damping body has a conical surface on which a wire spring is supported, which wire spring is secured to a fixed part of the motor.

10. A motor according to claim 1, in which the damping body is formed of plastic material and has an integrally formed spring.

11. A motor according to claim 10, in which the spring has a crank enclosing the edge of the bell-shaped rotor.

12. A motor according to claim 1, in which the force is at least equal to the weight of the rotor.

13. A motor according to claim 12, in which the force is at least equal with the vector sum of the rotor weight and the magnetic radial forces acting on the rotor.

14. A miniature synchronous motor having a damping body acting on the rotor, comprising a non-rotating damping body mounted for free rotation on the rotor shaft, spring means acting onto said damping body in a direction comprising a radial and an axial component thereby urging said damping body and rotor respectively in a radial and an axial direction for preventing play of the rotor in radial and in axial directions.

* * * * *